US010815079B2

(12) United States Patent
Linde

(10) Patent No.: US 10,815,079 B2
(45) Date of Patent: Oct. 27, 2020

(54) METHOD AND ARRANGEMENT FOR LOADING A SEMI-TRAILER ONTO A RAILWAY WAGON

(71) Applicant: SIDESTACKER AB, Limhamn (SE)

(72) Inventor: Peter Linde, Limhamn (SE)

(73) Assignee: SIDESTACKER AB, Limhamn (SE)

(*) Notice: Subject to any disclaimer, the term of this patent is extended or adjusted under 35 U.S.C. 154(b) by 0 days.

(21) Appl. No.: 16/466,262

(22) PCT Filed: Dec. 3, 2017

(86) PCT No.: PCT/SE2017/051204
§ 371 (c)(1),
(2) Date: Jun. 3, 2019

(87) PCT Pub. No.: WO2018/101883
PCT Pub. Date: Jun. 7, 2018

(65) Prior Publication Data
US 2019/0322474 A1    Oct. 24, 2019

(30) Foreign Application Priority Data

Dec. 4, 2016 (SE) ........................ 1630284

(51) Int. Cl.
*B65G 63/02* (2006.01)
*B61D 47/00* (2006.01)
*B65G 67/02* (2006.01)

(52) U.S. Cl.
CPC ......... *B65G 63/025* (2013.01); *B61D 47/005* (2013.01); *B65G 67/02* (2013.01)

(58) Field of Classification Search
CPC .. B61D 47/005; B65G 63/004; B65G 63/025; B65G 67/02
See application file for complete search history.

(56) References Cited

U.S. PATENT DOCUMENTS

| 1,529,223 | A | * | 3/1925 | Stoll | B65G 63/025 104/29 |
| 4,522,546 | A | * | 6/1985 | Ringer | B65G 63/025 104/48 |
| 4,783,190 | A | | 11/1988 | Lövgren | |

(Continued)

FOREIGN PATENT DOCUMENTS

| CA | 2691391 A1 | * | 7/2011 | ............ B61B 1/005 |
| DE | 102005037148 A1 | | 2/2006 | |

(Continued)

*Primary Examiner* — James Keenan
(74) *Attorney, Agent, or Firm* — Capitol City TechLaw

(57) ABSTRACT

A transfer arrangement for transferring a semi-trailer onto an intermodal pocket wagon from a ground location beside the wagon, or vice versa, may include base roller beams of a first lifting mechanism supported by the ground at the ground location and intended for lifting the semi-trailer up from the ground. Corresponding wagon roller beams of a second lifting mechanism may be supported by the rail or the ground under the wagon. The wagon roller beams may be elevated to substantially the same height as the base roller beams or lowered towards the ground. A transfer mechanism may be provided for transferring the semi-trailer sideways from the first lifting mechanism to the second lifting mechanism in the elevated condition thereof.

8 Claims, 8 Drawing Sheets

(56) References Cited

U.S. PATENT DOCUMENTS

| | | | | |
|---|---|---|---|---|
| 7,950,891 B2* | 5/2011 | Weidemann | ............ | B61D 3/04 |
| | | | | 414/344 |
| 2005/0158158 A1* | 7/2005 | Porta | .................... | B65G 63/025 |
| | | | | 414/392 |

FOREIGN PATENT DOCUMENTS

| | | | | |
|---|---|---|---|---|
| DE | 102006012208 A1 | 9/2007 | | |
| EP | 0619211 A1 | 10/1994 | | |
| EP | 1241118 A2 | 9/2002 | | |
| EP | 1634792 A2 | 3/2006 | | |
| EP | 2384947 A1 | 11/2011 | | |
| EP | 2489569 A1 | 8/2012 | | |
| EP | 2902299 A1 | 8/2015 | | |
| FR | 2884479 | 10/2006 | | |
| JP | 59194938 A | * 11/1984 | ........... | B65G 63/025 |
| WO | 2005097575 A1 | 10/2005 | | |
| WO | 2006018242 A2 | 2/2006 | | |
| WO | 2010144033 A1 | 12/2010 | | |

* cited by examiner

METHOD AND ARRANGEMENT FOR LOADING A SEMI-TRAILER ONTO A RAILWAY WAGON

This application claims priority under 35 USC 119(a)-(d) to SE patent application No. 1630284-6, which was filed on Dec. 4, 2016, the entire contents of which are incorporated herein by reference.

TECHNICAL FIELD

The present invention relates to a method and arrangement for transferring a semi-trailer or the like onto a rail-borne, intermodal pocket wagon from a ground location beside the wagon, being placed in parallel with the rail, or vice versa.

BACKGROUND OF THE INVENTION

It is well known in the art that in many instances it may be desirable to load a semi-trailer, normally intended for road transport, on a railway wagon and transport it in a train on a railway so as to provide a more efficient and environmentally tolerable transportation.

The loading and unloading of a semi-trailer on and off a railway wagon, built for this purpose, hereinafter referred to as an intermodal pocket wagon, usually requires that the semitrailers have special standardized lifting points and are loaded by means of cranes or heavy lift trucks. Such semi-trailers are called cranable semi-trailers. The advantage of such cranable semi-trailers is seen in the fact that they are suitable for combined transport. However, a disadvantage is the fact that such a semi-trailer for combined transport is technically complicated and therefore more expensive than non-cranable semi-trailers. The majority of the semi-trailers actually used are not equipped with the gripping edges required for combined transport and therefore not suitable for the transportation in pocket wagons for railway operation. Also, the investments in equipment, such as cranes and/or heavy lift trucks and specialized terminals that have to be reinforced to carry the axle load of the heavy lift trucks are burdensome.

There are examples of pocket wagons that can be laterally opened in some way, so that the loading of the semi-trailer can take place transversally without lifting the semi-trailer itself. A typical arrangement for accomplishing such a loading is shown in EP 1 776 264. This wagon suffers from the disadvantages that the wagon itself becomes heavy, complicated and expensive and also that the required fixed terminal installation is expensive.

Another example of an arrangement for loading a non-cranable semi-trailer is shown in EP 0 619 211, but the investments in the infrastructure are high and the complicated handling of the loose basket as well as the procedure to load the semi-trailer into the pocket are problematic.

A further example of a loading system that can handle non-cranable semi-trailers is shown in EP 1 634 792, where a hydraulic cylinder installed in the terminal lifts and turns the pocket so that the semitrailer can be driven off at a ramp or sideways. The terminal of such a concept requires a complicated and expensive installation.

Further examples of arrangements for transferring a semi-trailer onto an intermodal pocket wagon from a ground location beside the wagon are shown in EP 2 384 947 and EP 1 241 118, but these are regarded as less pertinent.

The main object of the invention is to provide a method and arrangement for transferring a non-cranable semi-trailer (or any semi-trailer) onto an intermodal pocket wagon without the drawbacks described above. Especially, there shall not be any large installations in the terminal, and the railway wagon shall preferably be of standard type, or as close as possible, and therefore inexpensive.

THE INVENTION

A method of transferring a semi-trailer onto a rail-borne, intermodal pocket wagon from a ground location beside the wagon, being placed in parallel with the rail, fulfilling the above requirements is according to the invention attained by lifting the semi-trailer substantially vertically up from the ground location by base roller beams of first lifting means, supported by the ground at the ground location, elevating corresponding wagon roller beams of second lifting means, supported by the rail or the ground under the wagon, in openings between side beams of the wagon, to substantially the same height as the first lifting means, transferring the semi-trailer sideways from the base roller beams to the wagon roller beams, and lowering the semi-trailer onto the wagon by the wagon roller beams.

A transfer arrangement according to the invention for transferring a semi-trailer onto a rail-borne, intermodal pocket wagon from a ground location beside the wagon, being placed in parallel with the rail, or vice versa, is characterized by base roller beams of first lifting means, supported by the ground at the ground location and intended for lifting the semi-trailer by said beams substantially vertically up from the ground, corresponding wagon roller beams of second lifting means to be supported by the rail or the ground under the wagon, said beams being intended for being elevated in openings between side beams of the wagon to substantially the same height as the base roller beams or for being lowered towards the ground, and a drive mechanism for transferring the semi-trailer sideways from the base roller beams to the wagon roller beams in the elevated condition thereof.

In a practical embodiment there can be two first lifting means with wagon roller beams and two second lifting means with base roller beams, said lifting means being arranged substantially perpendicular to the rail.

The arrangement may include a pocket insert for accommodating the semi-trailer and to be accommodated in a pocket of the pocket wagon. However, it may also be possible to handle the semi-trailer by the arrangement also without a separate pocket insert.

The transfer arrangement may preferably include a base structure, which is to be placed at a ground location beside the wagon. This base structure is provided with the first and the second lifting means.

Each first lifting means may include stanchions on the base structure for guiding the substantially horizontal base roller beam, which is substantially perpendicular to the rail and which can be moved between a lowered inactive position and an elevated active position.

Each second lifting means may be foldably attached to or can be pushed out from the base structure and include a lift beam to be supported by the rail and the wagon roller beam to be elevated or lowered by hydraulic cylinders between the lift beam and the wagon roller beam, the wagon roller beam and the base roller beam being substantially in line with each other when elevated.

The base roller beams and the wagon roller beams may preferably be provided with bearing rollers or the like at their upper surfaces.

The pocket insert if used may be provided with transversal slide plates for cooperation with the roller bearings or the like at the upper surfaces of the base roller beams and the wagon roller beams.

A drive mechanism is preferably provided for laterally transferring the pocket insert on the base roller beams and the wagon roller beams. It may be arranged at the top of each stanchion remote from the wagon roller beams.

The base structure may preferably be mobile and can be lifted, towed or self-propelled to an appropriate position in relation to the railway wagon.

The invention may be said to provide for the combination of a lifting and transferring arrangement with a pocket insert that can be fitted in a standard pocket wagon. The pocket insert can also be part of a wagon as a loose floor.

The transfer arrangement is positioned at a certain distance from the wagon and in a special longitudinal position. The transfer arrangement can be stationary installed in the terminal, and the wagon is then to be positioned relative to the transfer arrangement. Alternatively, the transfer arrangement can be positioned correctly relative to the wagon by means of a tractor, forklift or similar or by a self-driving mechanism with its own steering.

When the transfer arrangement is correctly positioned relative to the wagon, two beams are folded out from the transfer arrangement underneath the wagon in the space over the rail. The two beams are equipped with pressure surfaces against the rail head and a second beam fitted with rollers attached to two hydraulic cylinders can be rotated in position under the railway wagon, so that the rollers meet surfaces in the pocket insert placed in the railway wagon. The hydraulic cylinders lift the pocket insert in the wagon, so that the pocket comes over the fixed longitudinal side beams of the railway wagon.

In the transfer arrangement there are two more beams equipped with rollers that can be vertically manoeuvred. They are at this moment positioned at the same height as the beams with the hydraulic cylinders lifting the pocket insert. The pocket insert can now be horizontally transferred on the roller beams to the side of the wagon, centrally over the transfer arrangement base structure, and then lowered to the ground. The transfer arrangement base structure has slots to accommodate the structure of the pocket frame, so that the semi-trailer can be driven off the transfer arrangement by a normal terminal truck.

As a special embodiment a wagon could be optimized for the transfer arrangement by having its pocket structure separable from the rest of the wagon structure, so that the complete pocket floor can be lifted out from the wagon into the base structure of the transfer system. This could reduce the extra weight of an extra pocket insert. Also, it could be possible to optimize the space for the semi-trailer and the lifting beams of the transfer arrangement.

In a method of loading of a semi-trailer or the like on a railway wagon as defined above a transfer arrangement is positioned correctly relative to the wagon. Then two beams with hydraulic cylinders and a beam with rollers are inserted between the wagon bottom floor and the rail. Further on, the beams with rollers are lifted to a level above the fixed side beams of the railway wagon. A semi-trailer is driven onto or into a pocket insert on a base structure of the transfer arrangement. Then two beams with rollers lift the pocket insert with the semi-trailer to the same level as the beams with rollers inside the railway wagon. A drive mechanism pushes the pocket insert and the semi-trailer from the rollers of the base roller beam to the rollers of the beam inside the railway wagon. The beam with rollers inside the railway wagon is then lowered, so that the pocket insert and the semi-trailer is placed inside the fixed pocket of the railway wagon. The beams with rollers are lowered further and removed underneath the railway wagon, which now is loaded with the semi-trailer.

BRIEF DESCRIPTION OF THE DRAWINGS

The invention will be described in further detail below under reference to the accompanying drawings, in which.

DESCRIPTION OF EMBODIMENTS

Figure 1:
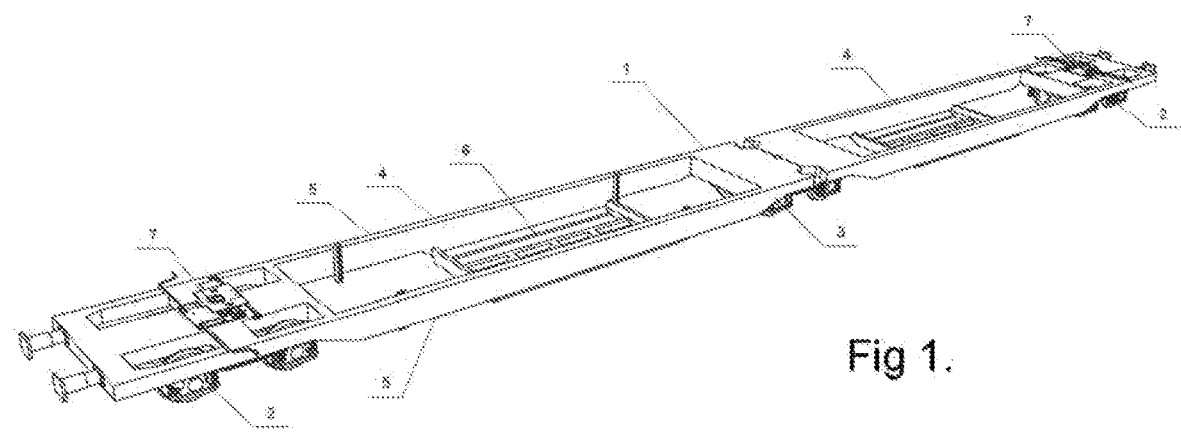
FIG. 1 is an isometric view of a railway wagon a conventional intermodal pocket wagon with a fixed pocket to be used in a first embodiment of the invention.

An articulated railway wagon 1 for loading a semi-trailer thereon is shown in FIG. 1. The wagon may be a standard intermodal pocket wagon. The shown wagon has three bogies (or wheel sets): two outward bogies 2 and one center bogie 3. The bogies 2 and 3 support a chassis 4, including fixed side beams 5 and a fixed pocket 6 intended to accommodate the tires of a semi-trailer, shown in FIG. 2. In each outer end of each chassis there is mounted a king-pin hitch 7 or fifth wheel. The king-pin hitch 7 is designed to accommodate and fasten a king-pin 12 of a semi-trailer 8 and hereby couple the semi-trailer to the railway wagon when loaded thereon.

Figure 2:
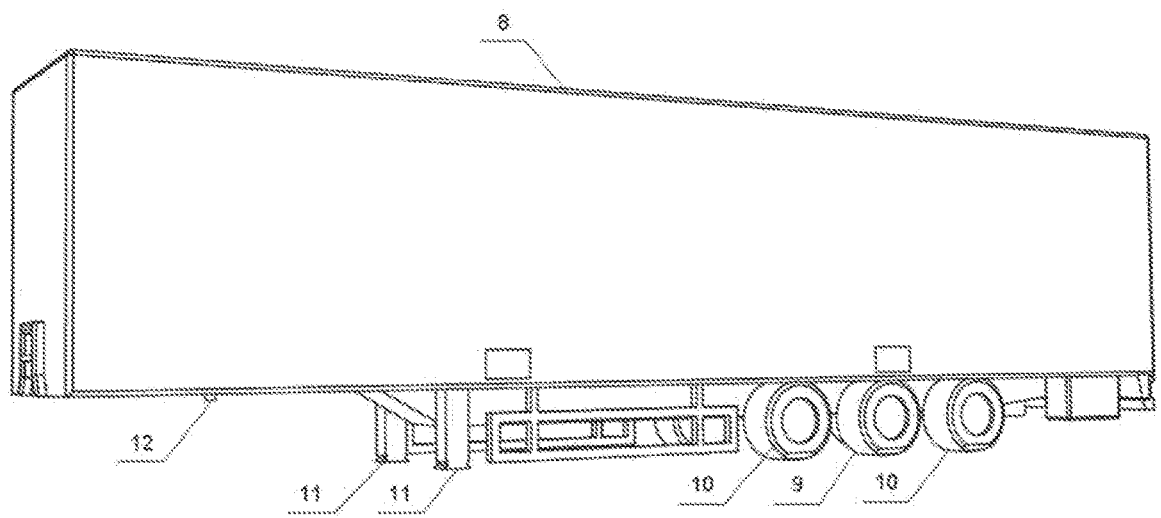
FIG. 2 is an isometric view of a semi-trailer of standard type.

A standard semi-trailer 8 is shown in FIG. 2. The semi-trailer 8 is equipped with three wheel axles with tires 9, 10 and a king-pin 12, which is used to couple the semi-trailer to a truck. Two support legs 11 can be lowered to the ground when the semi-trailer 8 is parked without any truck.

Figure 3:
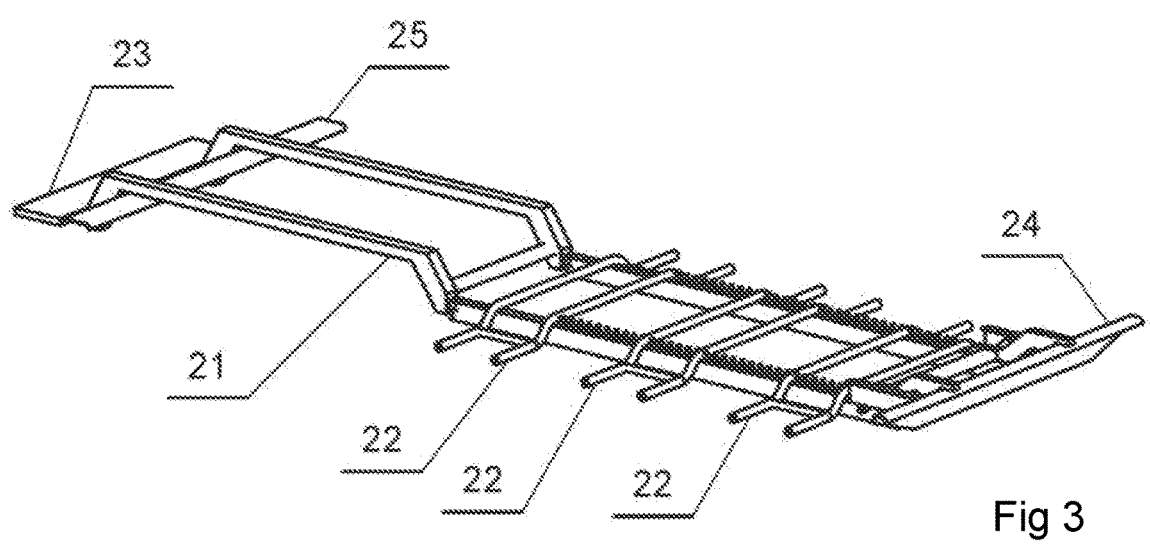
FIG. 3 is an isometric view of a pocket insert intended to carry or support the semi-trailer.
Figure 4:
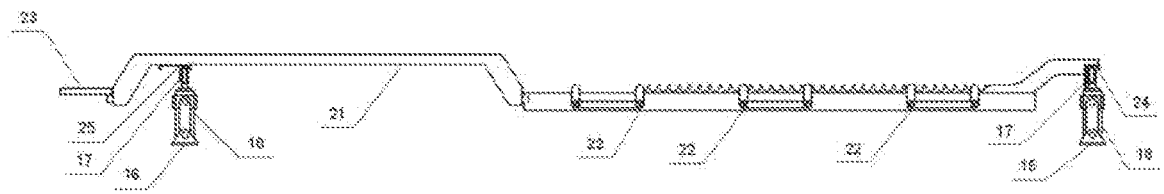
FIG. 4 is a side view of the pocket insert shown in FIG. 3.

A pocket insert 21 which can carry a semi-trailer 8 and also fit into a wagon pocket 6 is shown in FIG. 3. The pocket insert 21 has structural wheel supports 22 for the tires 9, 10 of the semitrailer 8 and also a leg support 23, where the support legs 11 of the semi-trailer 8 can be placed. The pocket insert 21 is also equipped with a rear slide plate 24 and a forward slide plate 25, intended to be used as the running surface of the pocket insert when transported laterally in a transfer arrangement 13 to be described. FIG. 4 shows the pocket insert 21 from the side together with rollers of roller beams 17 in contact with the slide plates 24, 25 of the pocket insert 21.

Figure 5:
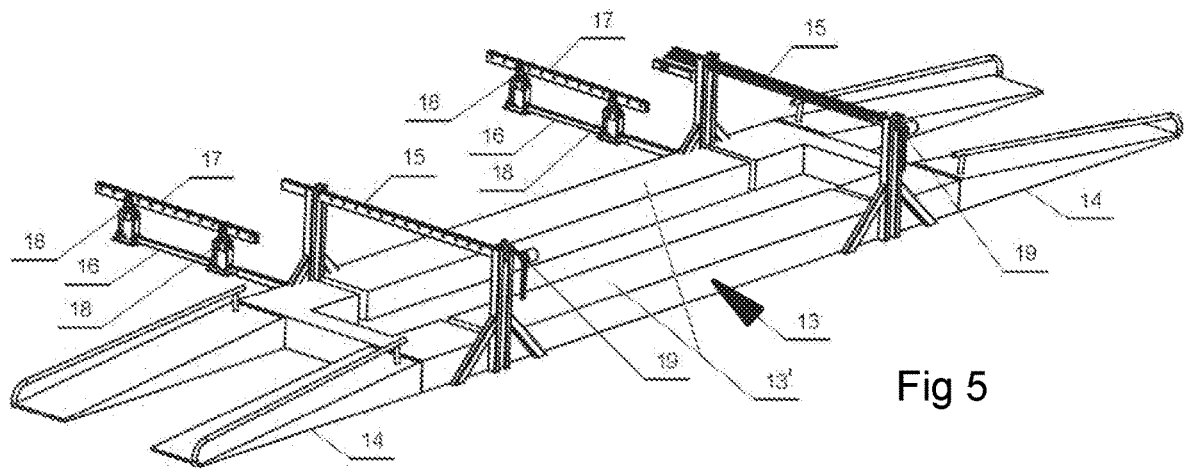
FIG. 5 is an isometric view of a transfer arrangement according to the invention.

A transfer arrangement 13 for transferring a semi-trailer from a ground position onto a railway wagon is shown in FIG. 5. The transfer arrangement has a base structure 13' with longitudinal base plates 20 with slots in order to accommodate a pocket 21 insert used to carry the semi-trailer 8 from the ground into the railway wagon 1, or vice versa. Attached to the end of each base plate 20 is a ramp 14 to provide a running surface for a towing truck to pull the semi-trailer 8 up onto the transfer arrangement 13.

Pivotally attached to one of the base plates 20 of the transfer arrangement 13 are two lift beams 16. The lift beams 16 have support areas for contact with the rail head of a rail 26 (FIG. 8) and two hydraulic cylinders 18 attached to a wagon roller beam 17. Each wagon roller beam 17 is shorter than the distance between two side beams 5 of the wagon 1, so that the wagon roller beams 17 may be elevated through openings there etween. At their upper surfaces the wagon roller beams 17 are provided with attached bearing rollers along their full length to provide for lateral transport of the pocket insert 21. The lift beams 16 can be folded out underneath the side beams 5 of the railway wagon 1.

Also part of the transfer arrangement are two base roller beams 15, made up in the same way as the wagon roller beams 17. These substantially horizontal base roller beams 15 are guided for substantially vertical movements by stanchions 20' on the base structure 13'. By for example hydraulic means these base roller beams 15 can be manoeuvred up or down to lift the pocket insert 21. At the upper end of each stanchion 20' opposite the lift beams 16 there may be provided a lateral drive mechanism 19 that can either push or pull the pocket insert 21 in the lateral direction on the base roller beams 15 and the wagon roller beams 17. The drive mechanisms 19 may be hydraulically driven and be of the type "fixed chain" or "push-pull-chain". Alternatively, the drive mechanisms may consist of driven rollers at the upper surfaces of the beams 16 and 17.

Figure 6:
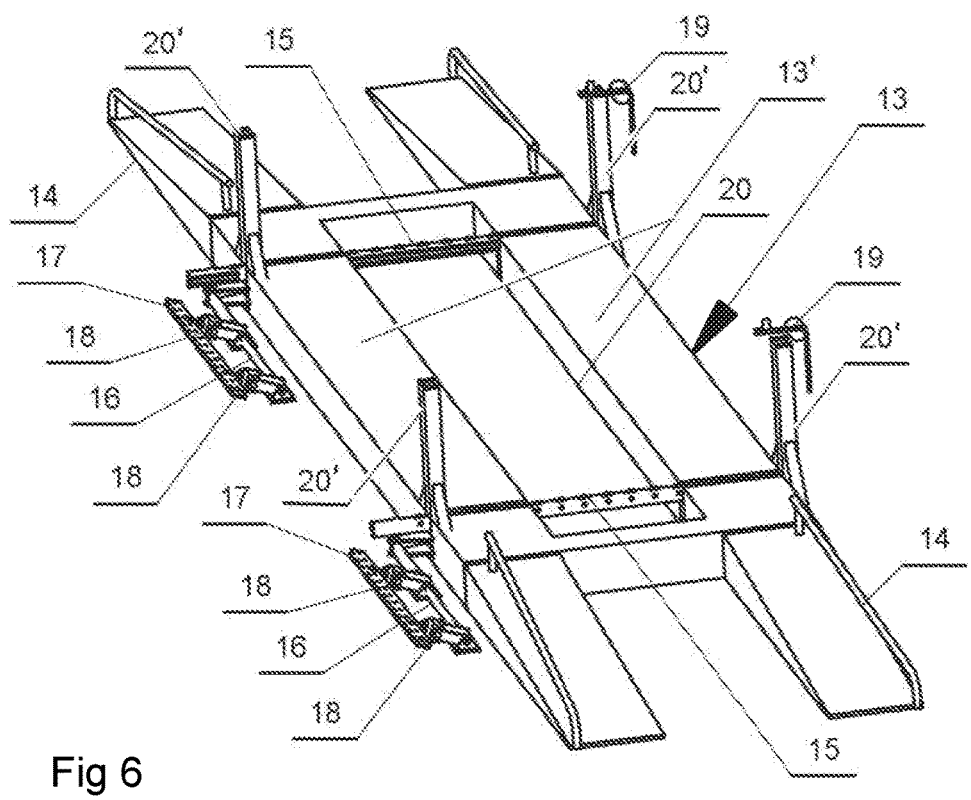
FIG. 6 is an isometric view of the transfer arrangement with lift beams folded in and angled.

FIG. 6 shows the transfer arrangement 13 with the lift beams 16 pivotally folded in along the side of one of the base plates 20. When the lift beams 16 are folded in, the rail beside the transfer arrangement is clear from parts of the transfer arrangement, which means that a railway wagon 1 can move along the rail freely in any direction without any interference with the transfer arrangement 13. In the shown position the hydraulic cylinders 18 and the wagon roller beams 17 are angled somewhat in respect to the lift beams 16 in order to require less space when the lift beams 16 shall be folded out underneath the fixed side beams 5 of the railway wagon 1. This is one possible solution to require less space, whereas another solution could be to make the lifting mechanism, i.e. the hydraulic cylinders 18, lower in its lowest position.

Figure 7:
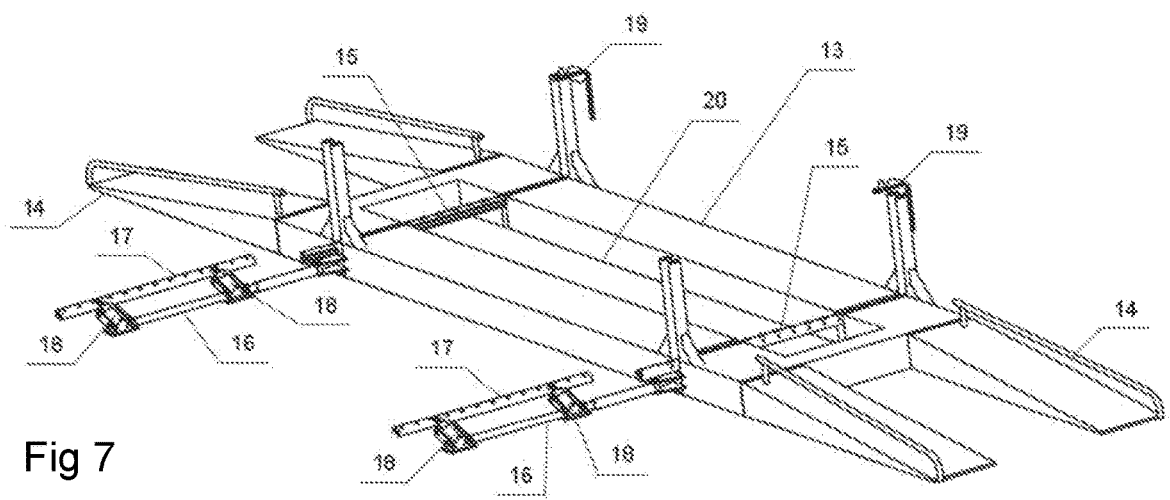
FIG. 7 is an isometric view of the transfer arrangement according to FIG. 6 but with the lift beams folded out and angled.

In FIG. 7 the lifting beams 16 of the transfer arrangement 13 are folded out. The hydraulic cylinders 18 and the wagon roller beams 17 are still angled somewhat in respect to the lift beams 16.

Figure 8:
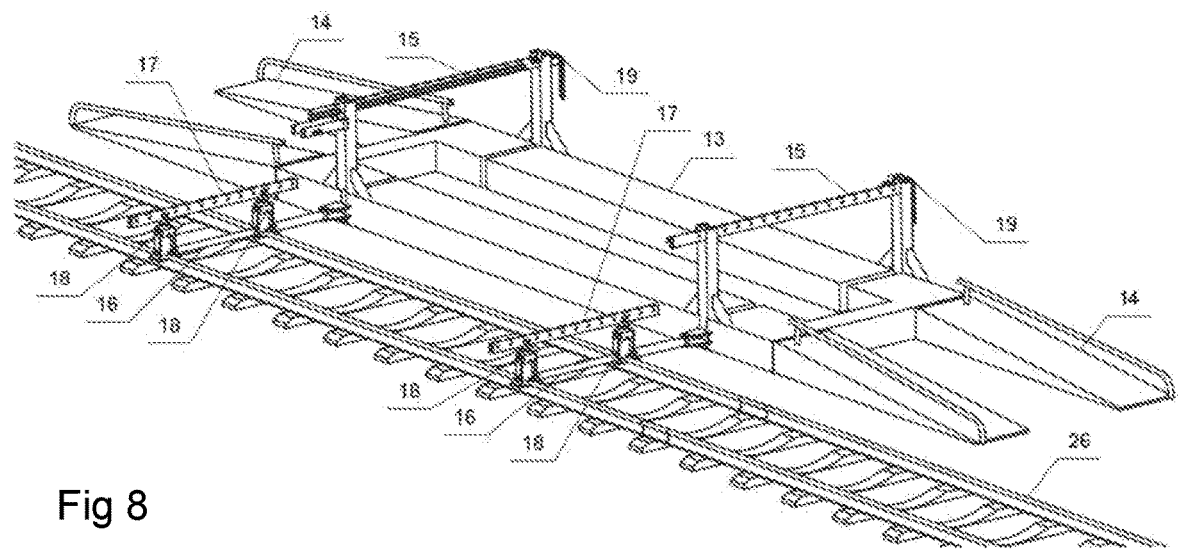
FIG. 8 is an isometric view of the transfer arrangement placed next to the rail, the lift beams being folded out and raised in a straight position and hydraulic cylinders being centered over the rail.

In FIG. 8 the hydraulic cylinders 18 and the wagon roller beams 17 are raised to a vertical position. The support surfaces below the hydraulic cylinders 18 are in contact with the rail head. The base roller beams 15 are in their final elevated position.

Figure 9:
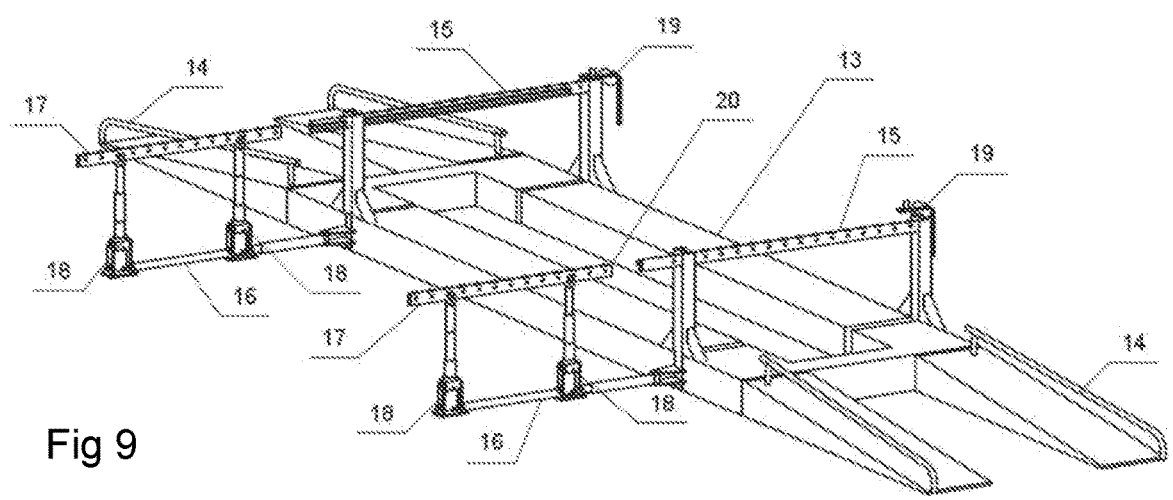
FIG. 9 is an isometric view of the transfer arrangement with roller beams in their upper or elevated position, the rail being deleted for better view of the components.

In FIG. 9 the hydraulic cylinders 18 are raised, so that the wagon roller beams 17 are in level with the base roller beams 15 forming a long rolling combination that can carry the pocket insert 21, when it is laterally transferred.

Figure 10:
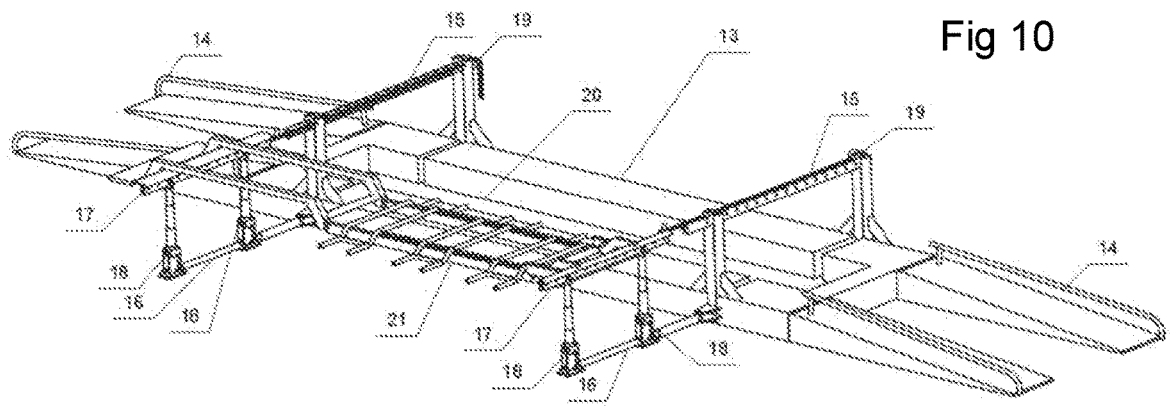
FIG. 10 is an isometric view of the transfer arrangement with the roller beams in their upper position and the pocket insert over the wagon position, FIG. 11 corresponds to FIG. 10, but the pocket insert is transferred laterally or sideways to be positioned over a base structure of the transfer arrangement.

FIG. 10 shows the transfer arrangement with the parts in same position as in FIG. 9, but the pocket insert 21 is added. The forward slide plate 25 and the rear slide plate 24 are resting on the wagon roller beams 17 over the lift beams 16. The lateral drive mechanisms 19 are extended in the lateral direction and connected to the pocket insert 21.

Figure 11:
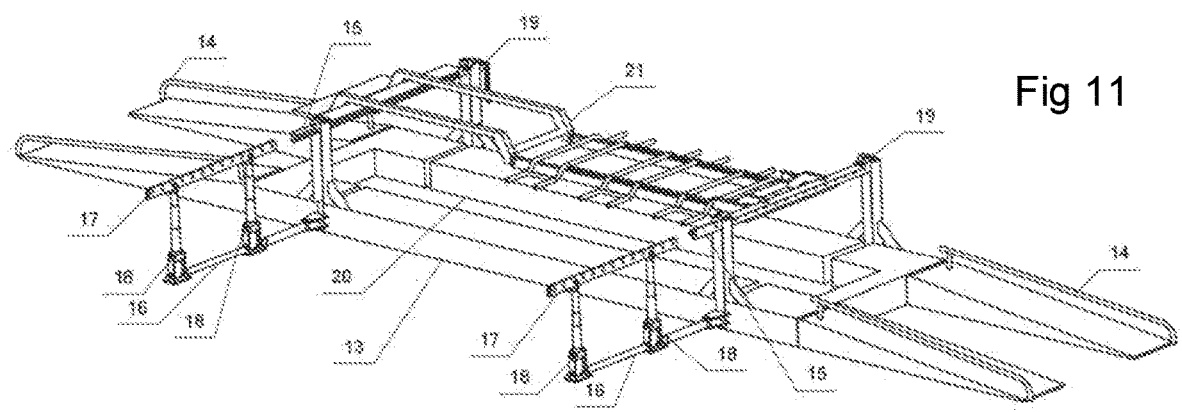

FIG. 11 shows the transfer arrangement with the parts in same position as in FIG. 10, but the pocket insert 21 is transferred laterally to be positioned centrally over the base structure 13. The lateral drive mechanisms 19 are retracted in the lateral direction and have pulled the pocket insert 21 to its shown position.

Figure 12:
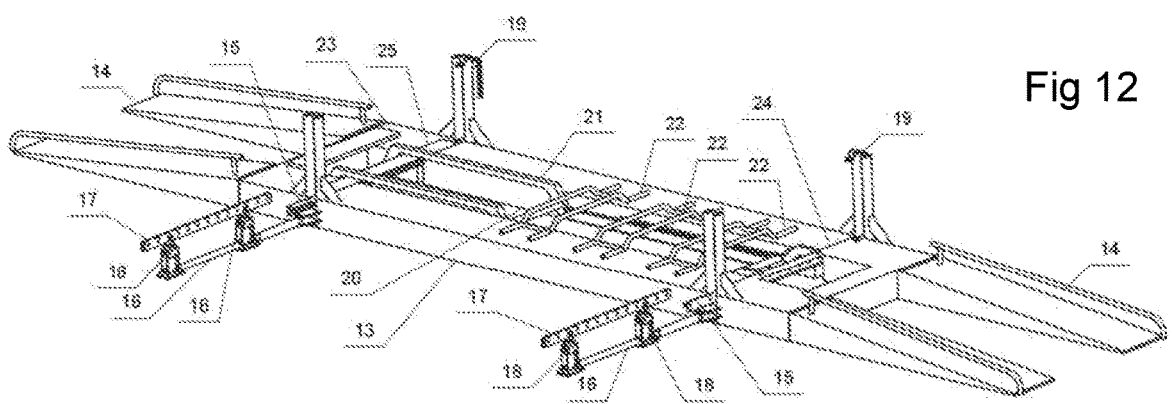
FIG. 12 is an isometric view of the transfer arrangement, where the roller beams and the pocket insert are lowered to the lowest position.

In FIG. 12 the base roller beams 15 have been lowered to their lowest position. The pocket insert 21 is then also all the way down and its longitudinal structure fits in the slots of the base plates 20. In this version the wheel supports 22 for the tires of the semi-trailer and the leg support 23 are lifted from their normal position in the pocket insert 21. This means that the rest of the structure of the pocket insert 21 is lowered compared to the wheel support 22 and the leg support 23 and is then out of the way, when the semi-trailer is to be driven on or off the base structure 13' of the transfer arrangement 13.

Figure 13:
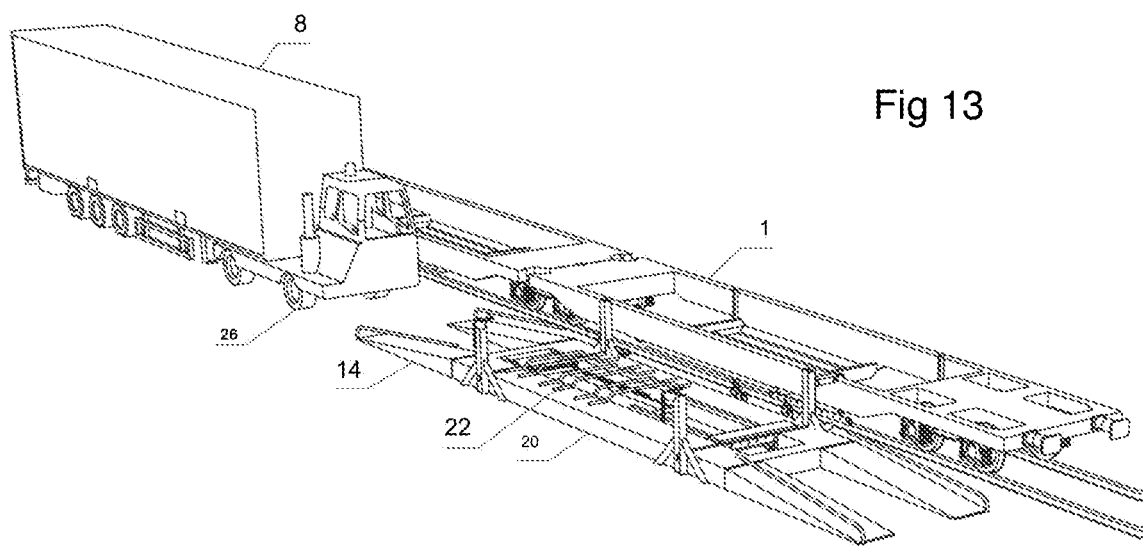
FIG. 13 is an isometric view of the transfer arrangement positioned next to a railway wagon and a terminal truck pulling the semi-trailer, FIG. 14 corresponds to FIG. 13 but shows when the terminal truck has pulled the semi-trailer up onto the transfer arrangement, FIG. 15 corresponds to FIG. 14 but shows the semi-trailer parked on the transfer arrangement, FIG. 16 corresponds to FIG. 15 but in a later handling stage, the semi-trailer being removed for better view of the components, FIG. 17 corresponds to FIG. 16 but in a later handling stage, the roller beams being raised in-between side beams of the railway wagon, FIG. 18 corresponds to FIG. 17 but in a later handling stage, the base roller beams being raised together with the pocket insert, FIG. 19 corresponds to FIG. 18 but in a later handling stage, the pocket insert having been laterally transferred to a position over the railway wagon, FIG. 20 corresponds to FIG. 19 but in a later handling stage, the pocket insert having been lowered and placed in the fixed pocket of the railway wagon, FIG. 21 corresponds to FIG. 20, but the semi-trailer is now shown loaded in the fixed pocket of the railway wagon together with the pocket insert.
Figure 23:
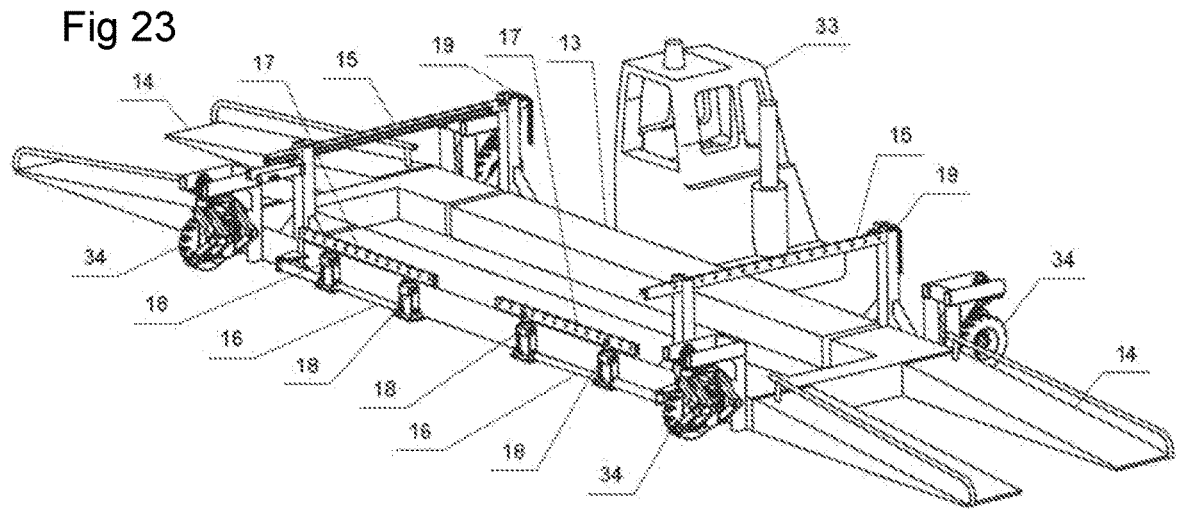
FIG. 23 is an isometric view of a transfer arrangement according to a third embodiment of the invention.

The procedure for loading a semi-trailer onto a railway wagon is shown in FIG. 13 to FIG. 20. First, the transfer arrangement 13 is positioned correctly in all directions in relation to the railway wagon 1 as shown in FIG. 13, either by moving the complete transfer arrangement by a towing truck, fork lift truck, crane or the like; alternatively the transfer arrangement could be equipped with wheels and driving mechanisms, as shown in FIG. 23 as a third embodiment of the invention, so it could be self-propelled into the correct position. The semi-trailer 8 is pulled by a terminal truck 26 towards the ramps 14 of the transfer arrangement 13. The pocket insert 21 is positioned in the slots of the base plates 20 of the transfer arrangement 13.

Figure 14:
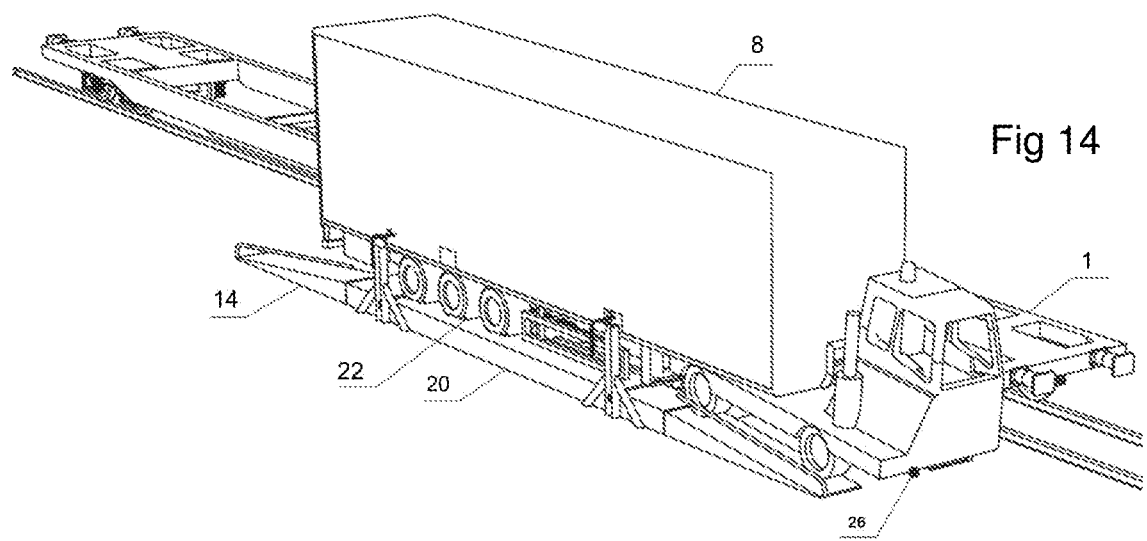
Figure 15:
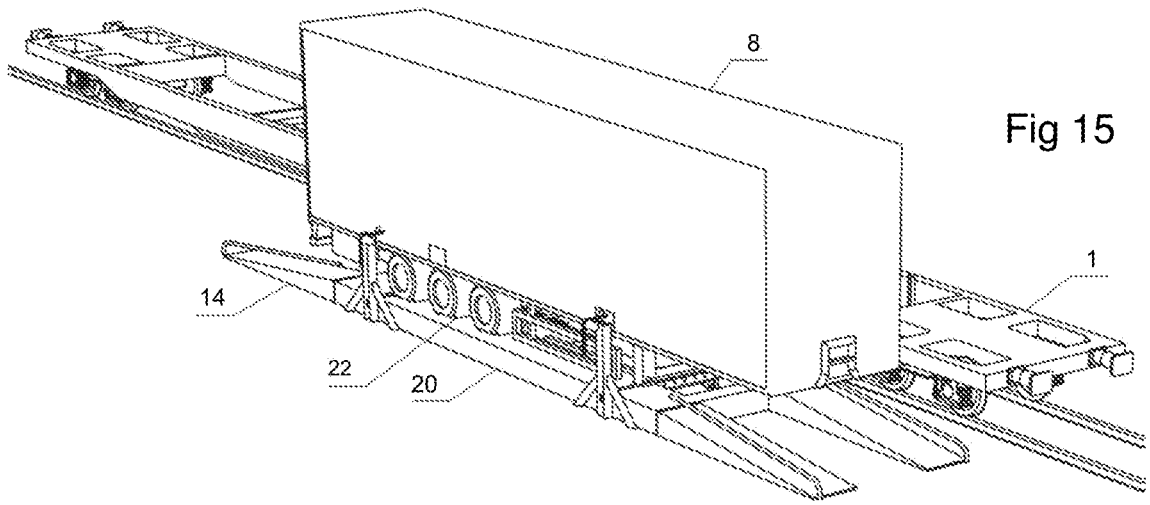

In FIG. 14 the terminal truck 26 has pulled the semi-trailer 8 up onto the base plates 20 of the transfer arrangement 13. The tires of the semi-trailer have been driven up and are positioned in the wheel supports 22 of the pocket insert 21. The support legs 11 of the semi-trailer are positioned over the leg support 23 of the pocket arrangement 21. In FIG. 15 the terminal truck has been de-coupled from the king-pin 12 of the semi-trailer 8 and parked the semi-trailer in the correct position on the transfer arrangement 13. In the following FIG. 16 to FIG. 20 the semi-trailer 8 is not shown in the figures to make the remaining components of the procedure more visible, but it shall be envisaged to be placed on the pocket insert 21, where the wheel supports 22 and the leg support 23 are supporting the semi-trailer.

Figure 16:
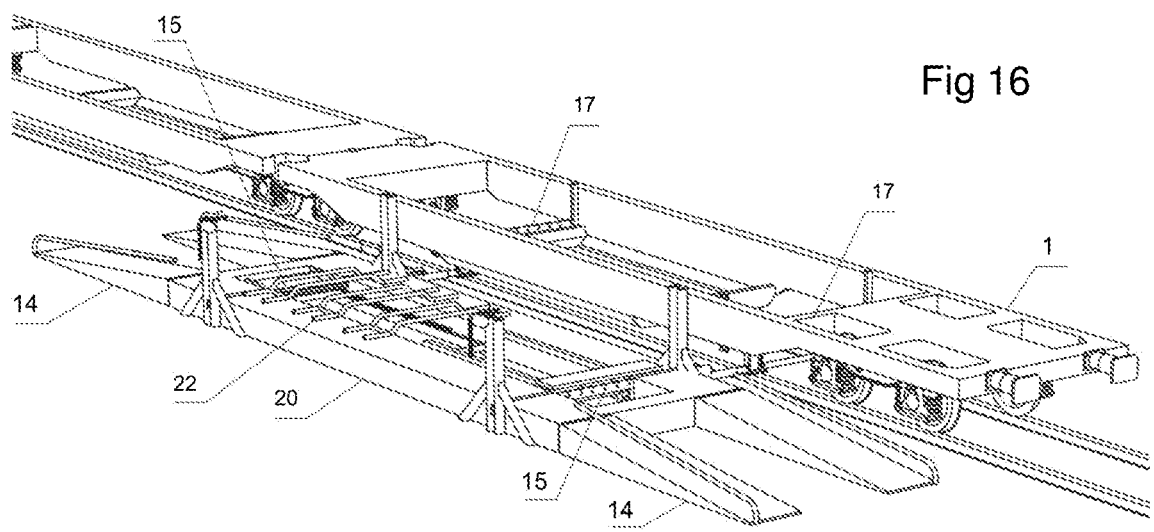
Figure 17:
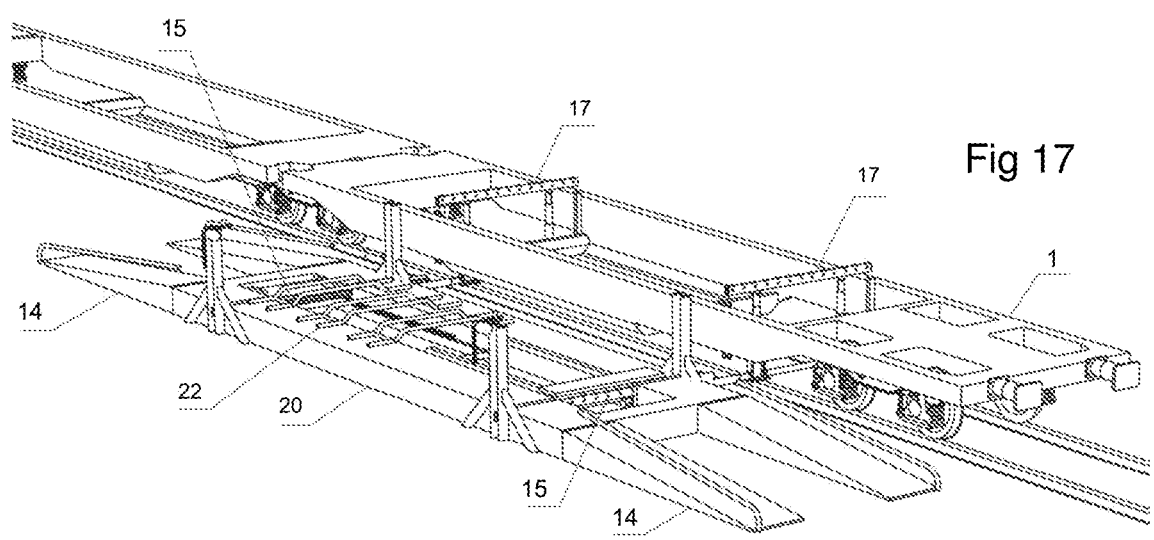

The first step after the semi-trailer 8 is loaded onto the transfer arrangement 13 is that the lift beams 16, pivotally attached to one of the base plates 20, are turned out under the longitudinal side beams 5 of the railway wagon 1, as shown in FIG. 16. Next, as shown in FIG. 17, the wagon roller beams 17 are raised to a position above the side beams 5 of the railway wagon 1.

Figure 18:
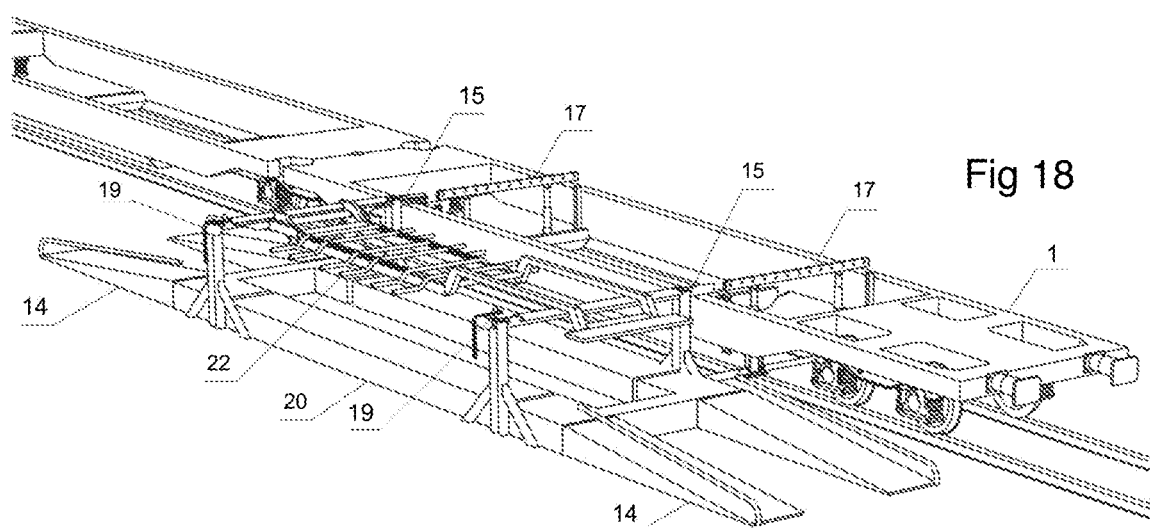
Figure 19:
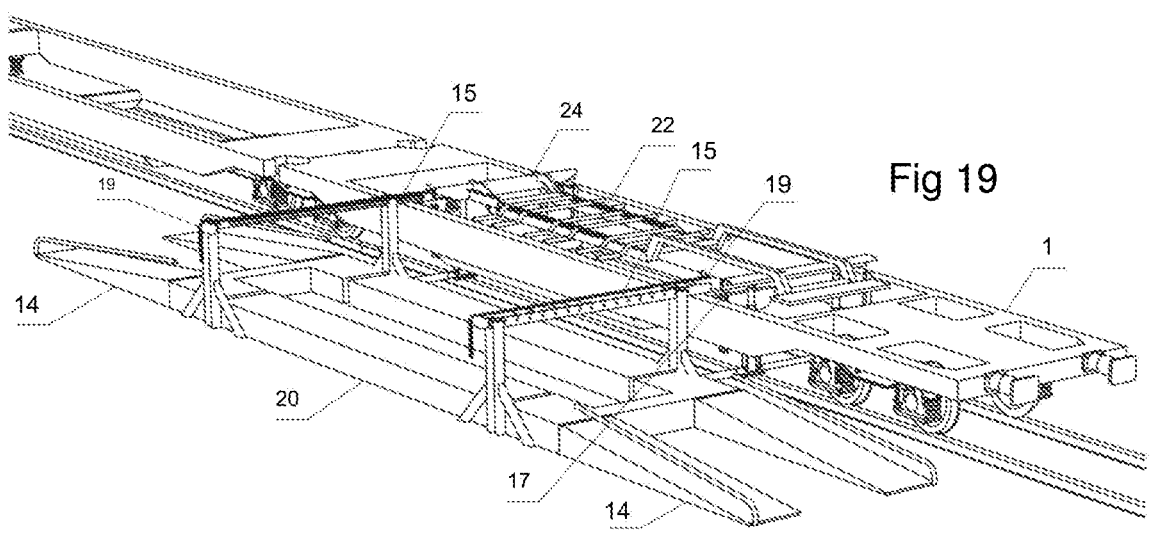
Figure 20:
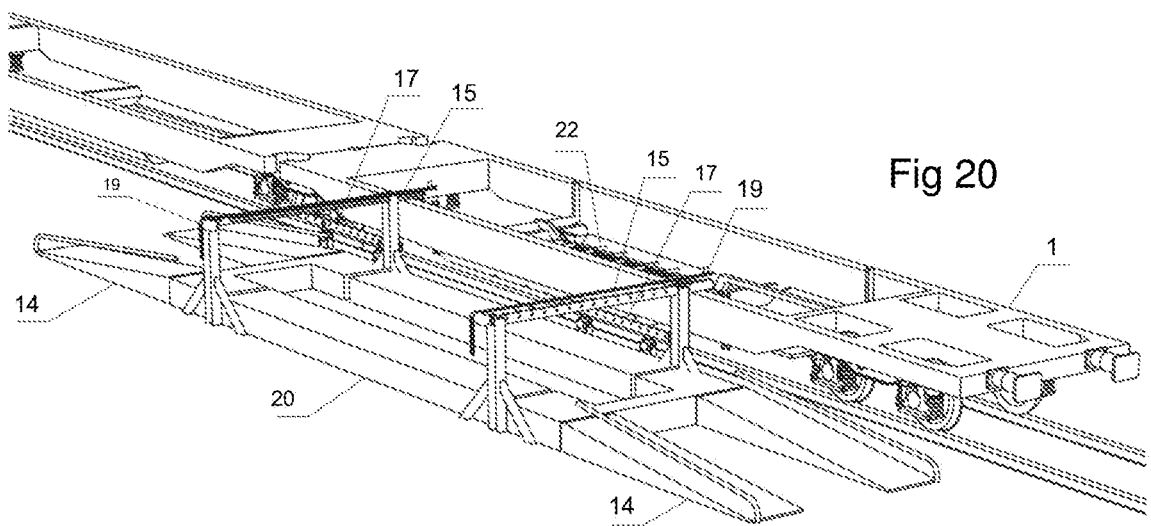

In the third step of the loading process, shown in FIG. 18, the base roller beams 15 are raised, the rollers of the base rolling beams 15 come in contact with the rear slide plate 24 and the forward slide plate 25, as shown in FIG. 4, and the pocket insert 21 is then lifted vertically together with the vertical movement of the base roller beams 15. Now the pocket insert 21, together with the semi-trailer 8, has been lifted to the height where the base roller beams 15 are in level with the wagon roller beams 17. The lateral drive mechanisms 19 are connected to the pocket insert 21 and then push the pocket insert 21 laterally. The rear slide plate 24 and the forward slide plate 25 are sliding, together with the rest of the pocket insert 21 and the semi-trailer 8, laterally on the rollers of the base rolling beams 15 and then, when it has moved further laterally, on the rollers of the wagon roller beams 17, as shown in FIG. 19. The lateral drive mechanisms 19 disconnect from the pocket insert 21, and the hydraulic cylinders 18 of the lift beams 16 are lowered all the way down. Now the pocket insert 21 is placed in the fixed pocket 6 of the railway wagon 1, as shown in FIG. 20.

Figure 21:
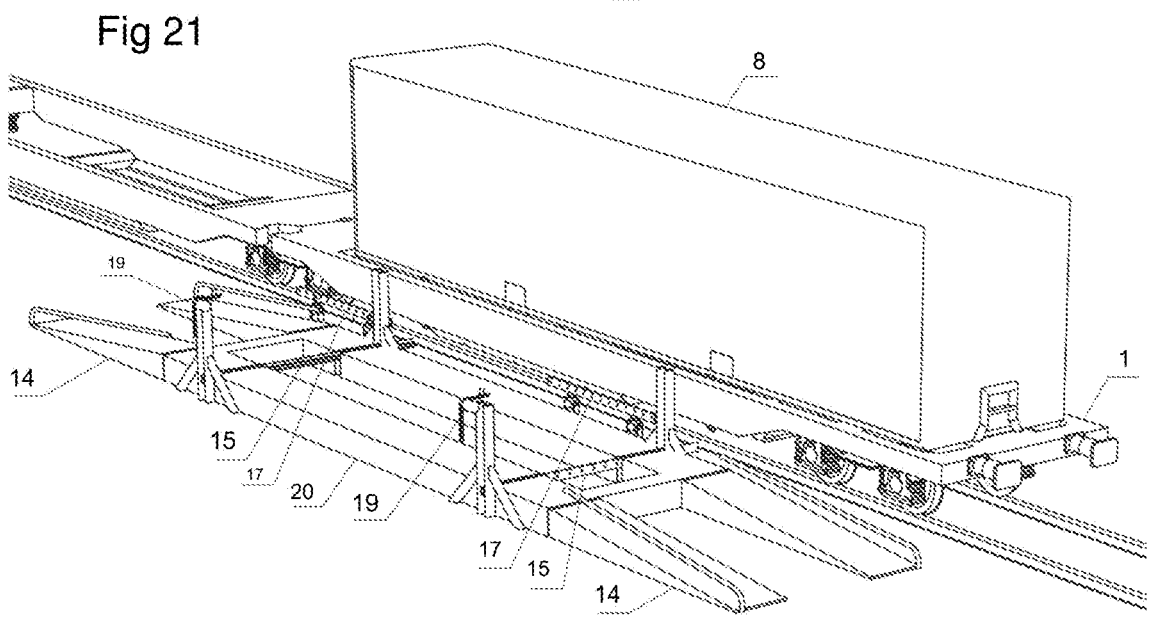

FIG. 21 shows the semi-trailer 8 loaded into the railway wagon 1, and both lift beams 16 are folded away from the wagon 1. Thus, the transfer arrangement 13 is then not in any way connected to or obstructing further movement of the railway wagon 1.

Figure 22:
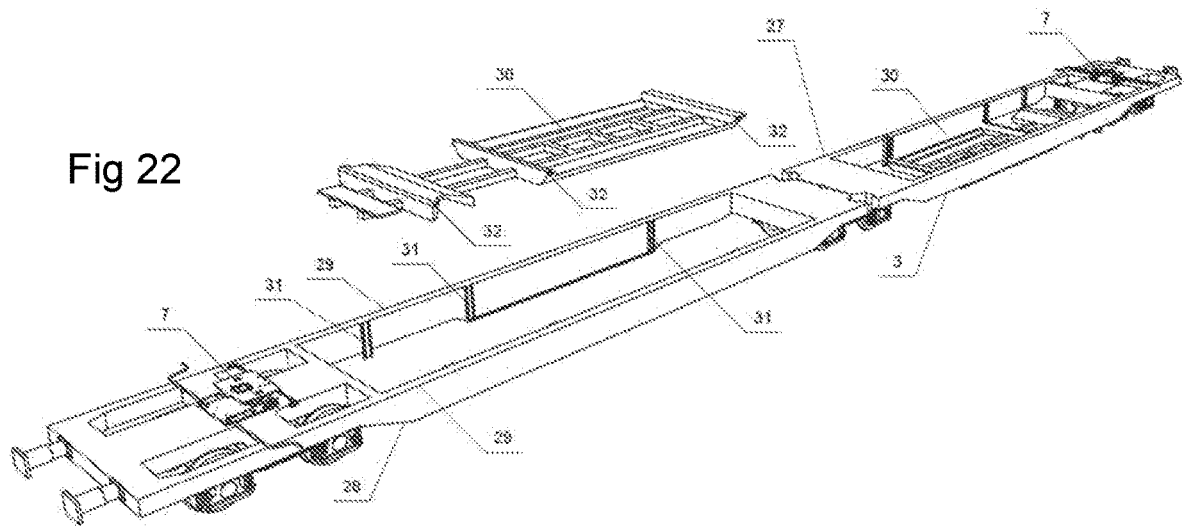
FIG. 22 is an isometric view of a railway wagon according to a second embodiment of the invention.

A second embodiment is shown in FIG. 22, where a special railway wagon 27 is designed with a chassis 28, including fixed side beams 29 and a loose pocket insert 30 intended to accommodate the tires of a semi-trailer, shown in FIG. 2. The loose pocket 30 insert can be lowered in-between the fixed side beams 29, so that spigots 32 on the loose pocket insert are fitted in slots 31 inside the fixed side beams 29 intended to attach the loose pocket 30 to the chassis 28.

In this second embodiment the railway wagon is of a special design intended to be loaded generally with the same transfer arrangement as described in the first embodiment. The wagon is designed with a loose pocket insert that is part of the railway wagon and replaces the fixed pocket in a standard railway wagon, and by doing this the cost and the tare weight of the extra pocket insert, as used in the first embodiment, can be saved. One other advantage with a specially designed railway wagon and accompanying pocket insert is that the interfaces with the transfer arrangement can be further optimized, when the space is not taken up by a fixed pocket as in a standard railway wagon. The procedure of loading and unloading the railway wagon is the same as described in the first embodiment, but the pocket insert is here replaced by the loose pocket of the wagon, and in the last loading sequence, as shown in FIG. 20, the loose pocket is lowered in-between the fixed side beams of the wagon and fitted in the slots inside of the fixed side beams, which couples the loose pocket of the wagon to the fixed side beams.

A third embodiment is shown in FIG. 23 where a transfer arrangement 13 is provided with four wheel assemblies 34, which can be lowered and lift the transfer arrangement from the ground in order to transport it into the correct position in relation to the railway wagon 1 to be loaded. The self-propelled transfer arrangement in FIG. 23 could also be equipped with a cabin 33, where an operator can drive the transfer arrangement as well as control the loading sequences.

Above, the two lift beams 16 are said to be pivotally or foldably attached to the base plates 20 of the transfer arrangement 13, as is also illustrated in the drawings. As a modification the lift beams 16 may be arranged inside the transfer arrangement 13 in their rest position and be pushed out for their intended action, as described above.

Ordinary containers and similar objects may of course be loaded on a railway wagon in the same manner and by means of an arrangement according to the invention.

Modifications are possible within the scope of the appended claims.

The invention claimed is:

1. A transfer arrangement for transferring a semi-trailer onto a rail-borne, intermodal pocket wagon from a ground location beside the wagon, or vice versa, the semi-trailer being placed in parallel with the rail, the transfer arrangement comprising:
   base roller beams of first lifting means, supported by the ground at the ground location and configured to lift the semi-trailer by the base roller beams vertically up from the ground;
   corresponding wagon roller beams of second lifting means configured to be supported by the rail or the ground under the wagon, the wagon roller beams being configured to be elevated through openings between side beams of the wagon to the same height as the base roller beams or being configured to be lowered towards the ground;
   a drive mechanism configured to transfer the semi-trailer sideways from the base roller beams to the wagon roller beams in the elevated condition;
   a base structure, which is configured to be placed at a ground location beside the wagon;
   wherein the base structure includes the first and the second lifting means; and
   wherein each first lifting means includes stanchions on the base structure configured to guide the base roller beam, which is perpendicular to the rail and which can be moved between a lowered inactive position and an elevated active position.

2. The transfer arrangement according to claim 1, comprising:
- a pocket insert configured to accommodate the send-trailer and to he accommodated in a. pocket of the wagon;
- wherein the drive mechanism is configured to laterally transfer the pocket insert on the base roller beams and the wagon roller beams; and
- wherein the drive mechanism is arranged at the top of each stanchion remote from the wagon roller beams.

3. A transfer arrangement for transferring a semi-trailer onto a rail-bone, intermodal pocket wagon from a ground location beside the wagon, or vice versa, the semi-trailer being placed in parallel with the rail, the transfer arrangement comprising:
- base roller beams of first lifting means, supported by the ground at the ground location and configured to lift the semi-trailer vertically up from the ground by elevating the base roller beams;
- corresponding wagon roller beams of second lifting means configured to be supported by the rail or the ground under the wagon, the wagon roller beams being configured to be elevated through openings between side beams of the wagon to the same height as the base roller beams or being configured to be lowered towards the ground;
- a drive mechanism configured to transfer the semi-trailer sideways from the base roller beams to the wagon roller beams in the elevated condition; and
- a base structure, which is configured to be placed at a ground location beside the wagon;
- wherein the base structure includes the first and the second lifting means
- wherein each second lifting means is foldably attached to or can be pushed out from the base structure and includes a lift beam configured to be supported by the rail;
- wherein the wagon roller beam is configured to be elevated or lowered by hydraulic cylinders between the lift beam and the wagon roller beam; and
- wherein the wagon roller beam and the base roller beam are in line with each other when elevated.

4. The transfer arrangement according to claim 3, comprising:
- two of the first lifting means with the base roller beams; and
- two of the second lifting means with the wagon roller beams;
- wherein the first and the second lifting means are arranged perpendicular to the rail.

5. The transfer arrangement according to claim 3, comprising:
- a pocket insert configured to accommodate the semi-trailer and to be accommodated in a pocket of the wagon.

6. The transfer arrangement according to claim 5, wherein the pocket insert is provided with transversal slide plates for cooperation with roller bearings provided at the upper surfaces of the base roller beams and the wagon roller beams.

7. The transfer arrangement according to claim 3, wherein the base roller beams and the wagon roller beams are provided with bearing rollers at their upper surfaces.

8. The transfer arrangement according to claim 3, wherein the base structure is mobile and can be lifted, towed or self-propelled to an appropriate position in relation to the wagon.

* * * * *